(12) United States Patent
Carter et al.

(10) Patent No.: US 11,113,267 B2
(45) Date of Patent: Sep. 7, 2021

(54) ENFORCING PATH CONSISTENCY IN GRAPH DATABASE PATH QUERY EVALUATION

(71) Applicant: Microsoft Technology Licensing, LLC, Redmond, WA (US)

(72) Inventors: Andrew J. Carter, Mountain View, CA (US); Ying Lu, Sunnyvale, CA (US); Siddharth Shah, Mountain View, CA (US); Andrew Rodriguez, Palo Alto, CA (US); Scott M. Meyer, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 16/588,644

(22) Filed: Sep. 30, 2019

(65) Prior Publication Data

US 2021/0097054 A1    Apr. 1, 2021

(51) Int. Cl.
| | | |
|---|---|---|
| *G06F 17/00* | (2019.01) | |
| *G06F 16/23* | (2019.01) | |
| *G06F 16/901* | (2019.01) | |
| *G06F 16/248* | (2019.01) | |
| *G06F 17/16* | (2006.01) | |
| *G06F 16/28* | (2019.01) | |
| *G06F 16/22* | (2019.01) | |

(52) U.S. Cl.
CPC ...... *G06F 16/2365* (2019.01); *G06F 16/2282* (2019.01); *G06F 16/248* (2019.01); *G06F 16/284* (2019.01); *G06F 16/9024* (2019.01); *G06F 17/16* (2013.01)

(58) Field of Classification Search
CPC ........ G06F 16/13; G06F 16/24; G06F 16/156; G06F 11/07; G06N 3/00; G06N 5/00; G05B 13/00
See application file for complete search history.

(56) References Cited

U.S. PATENT DOCUMENTS

| | | |
|---|---|---|
| 8,185,558 B1 | 5/2012 | Narayanan et al. |
| 8,533,182 B1 | 9/2013 | Charboneau |
| (Continued) | | |

FOREIGN PATENT DOCUMENTS

| | | |
|---|---|---|
| EP | 2937797 A1 | 10/2015 |
| WO | 2012091844 A1 | 7/2012 |

OTHER PUBLICATIONS

Meyer et al.; "Liquid: LinkedIn's Relational Graph Data Model", ACM Conference Proceedings, 2018 ACM, ISBN 978-1-4503-2138-9.

(Continued)

*Primary Examiner* — Hung D Le
(74) *Attorney, Agent, or Firm* — Hickman Becker Bingham Ledesma LLP

(57) ABSTRACT

The disclosed embodiments provide a system for processing queries of a graph database. During operation, the system stores intermediate results of the query in a structure comprising rows in a set of tables and links between pairs of rows in different tables in the set of tables. Next, the system tracks, in the structure, representations of data, relationships, and path consistency in the query. The system then applies one or more operations to existing rows in the structure to generate a final result of the query. Finally, the system provides the final result in a response to the query.

20 Claims, 7 Drawing Sheets

(56) References Cited

U.S. PATENT DOCUMENTS

| | | |
|---|---|---|
| 8,736,612 B1 | 5/2014 | Goldman et al. |
| 9,330,138 B1 | 5/2016 | Shankar et al. |
| 9,378,303 B1 | 6/2016 | Shankar et al. |
| 9,514,247 B1 * | 12/2016 | Song ................. G06F 16/90335 |
| 9,535,963 B1 * | 1/2017 | Shankar ............. G06F 16/2433 |
| 2003/0084043 A1 | 5/2003 | Acharya et al. |
| 2007/0192306 A1 | 8/2007 | Papakonstantinou et al. |
| 2007/0239694 A1 | 10/2007 | Singh et al. |
| 2008/0116449 A1 | 5/2008 | Macready et al. |
| 2008/0306910 A1 | 12/2008 | Singh |
| 2009/0132503 A1 | 5/2009 | Sun et al. |
| 2009/0240649 A1 | 9/2009 | Sereni et al. |
| 2009/0240682 A1 | 9/2009 | Balmin et al. |
| 2011/0270861 A1 | 11/2011 | Arshavsky et al. |
| 2012/0005224 A1 | 1/2012 | Ahrens et al. |
| 2012/0047114 A1 | 2/2012 | Duan et al. |
| 2012/0054129 A1 | 3/2012 | Aggarwal |
| 2012/0096043 A1 | 4/2012 | Stevens, Jr. |
| 2012/0136884 A1 | 5/2012 | Kanawa |
| 2012/0179644 A1 | 7/2012 | Miranker |
| 2012/0284255 A1 | 11/2012 | Schechter et al. |
| 2013/0097180 A1 | 4/2013 | Tseng |
| 2014/0067850 A1 * | 3/2014 | Schrock ................ G06F 16/532 707/769 |
| 2014/0169073 A1 * | 6/2014 | Takahashi ................ G11C 5/14 365/149 |
| 2014/0172914 A1 * | 6/2014 | Elnikety ............. G06F 16/9024 |
| 2014/0195564 A1 | 7/2014 | Talagala et al. |
| 2014/0201234 A1 | 7/2014 | Lee et al. |
| 2014/0280044 A1 | 9/2014 | Huynh et al. |
| 2014/0310302 A1 | 10/2014 | Wu et al. |
| 2014/0330867 A1 | 11/2014 | Sarkar et al. |
| 2014/0337373 A1 | 11/2014 | Morsi et al. |
| 2015/0026158 A1 | 1/2015 | Jin |
| 2015/0120717 A1 | 4/2015 | Kim et al. |
| 2015/0120775 A1 | 4/2015 | Shao et al. |
| 2015/0127677 A1 | 5/2015 | Wang et al. |
| 2015/0134637 A1 | 5/2015 | Pall et al. |
| 2015/0302300 A1 | 10/2015 | Fletcher et al. |
| 2016/0171540 A1 | 6/2016 | Mangipudi et al. |
| 2017/0169073 A1 * | 6/2017 | Pirahesh ............. G06F 16/2433 |
| 2018/0144061 A1 | 5/2018 | Rodriguez et al. |
| 2018/0246929 A1 * | 8/2018 | Kreutzer ............. G06F 16/2246 |
| 2019/0303478 A1 * | 10/2019 | Carter ................ G06F 16/24565 |
| 2020/0201909 A1 * | 6/2020 | Das ..................... G06F 16/9024 |

OTHER PUBLICATIONS

"Non Final Office Action Issued in U.S. Appl. No. 15/939,065", dated Aug. 27, 2020, 13 Pages.

"Delta Encoding", Retrieved from: https://en.wikipedia.org/wiki/Delta_encoding, Retrieved Date: Apr. 10, 2017, 4 Pages.

"Non Final Office Action Issued in U.S. Appl. No. 15/360,605", dated Oct. 17, 2018, 19 Pages.

Blandford, et al., "An Experimental Analysis of a Compact Graph Representation", In Proceedings of Sixth Workshop on Algorithm Engineering and Experiments, Jan. 1, 2004, 14 Pages.

Dean, Jeff, "Challenges in Building Large-Scale Information Retrieval Systems", In Proceedings of the Second ACM International Conference on Web Search and Data Mining, Feb. 9, 2009, 77 Pages.

Koszewnik, Drew, "The Netflix Tech Blog: NetflixGraph Metadata Library: An Optimization Case Study", Retrieved from http://techblog.netflix.com/2013/01/netflixgraphmetadata-library_18.html, Jan. 18, 2013, 10 Pages.

Lemire, et al., "Decoding billions of integers per second through vectorization", In Journal of Software—Practice and Experience, Experience, vol. 45, Issue 1, Jan. 1, 2015, 29 Pages.

Ousterhout, et al., "The RAMCloud Storage System", In Journal of ACM Transactions on Computer Systems, vol. 33, Issue 3, Sep. 2015, 55 Pages.

"International Search Report and Written Opinion Issued in PCT Application No. PCT/US2016/068119", dated Aug. 18, 2017, 11 Pages.

Shao, et al., "Trinity: A Distributed Graph Engine on a Memory Cloud", In Proceedings of the ACM SIGMOD International Conference on Management of Data, Jun. 22, 2013, pp. 505-516.

Stepanov, et al., "SIMD-Based Decoding of Posting Lists", In Proceedings of the 20th ACM Conference on Information and Knowledge Management, Oct. 24, 2011, 9 Pages.

* cited by examiner

ENFORCING PATH CONSISTENCY IN GRAPH DATABASE PATH QUERY EVALUATION

RELATED APPLICATIONS

The subject matter of this application is related to the subject matter in a co-pending non-provisional application, entitled "Path Query Evaluation in Graph Databases," having Ser. No. 15/939,065 and filing date 23 Mar. 2018.

The subject matter of this application is also related to the subject matter in a co-pending non-provisional application, entitled "Edge Store Designs for Graph Databases," having Ser. No. 15/360,605 and filing date 23 Nov. 2016.

BACKGROUND

Field

The disclosed embodiments relate to graph databases. More specifically, the disclosed embodiments relate to techniques for enforcing path consistency in graph database path query evaluation.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of the results or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

Figure 1:
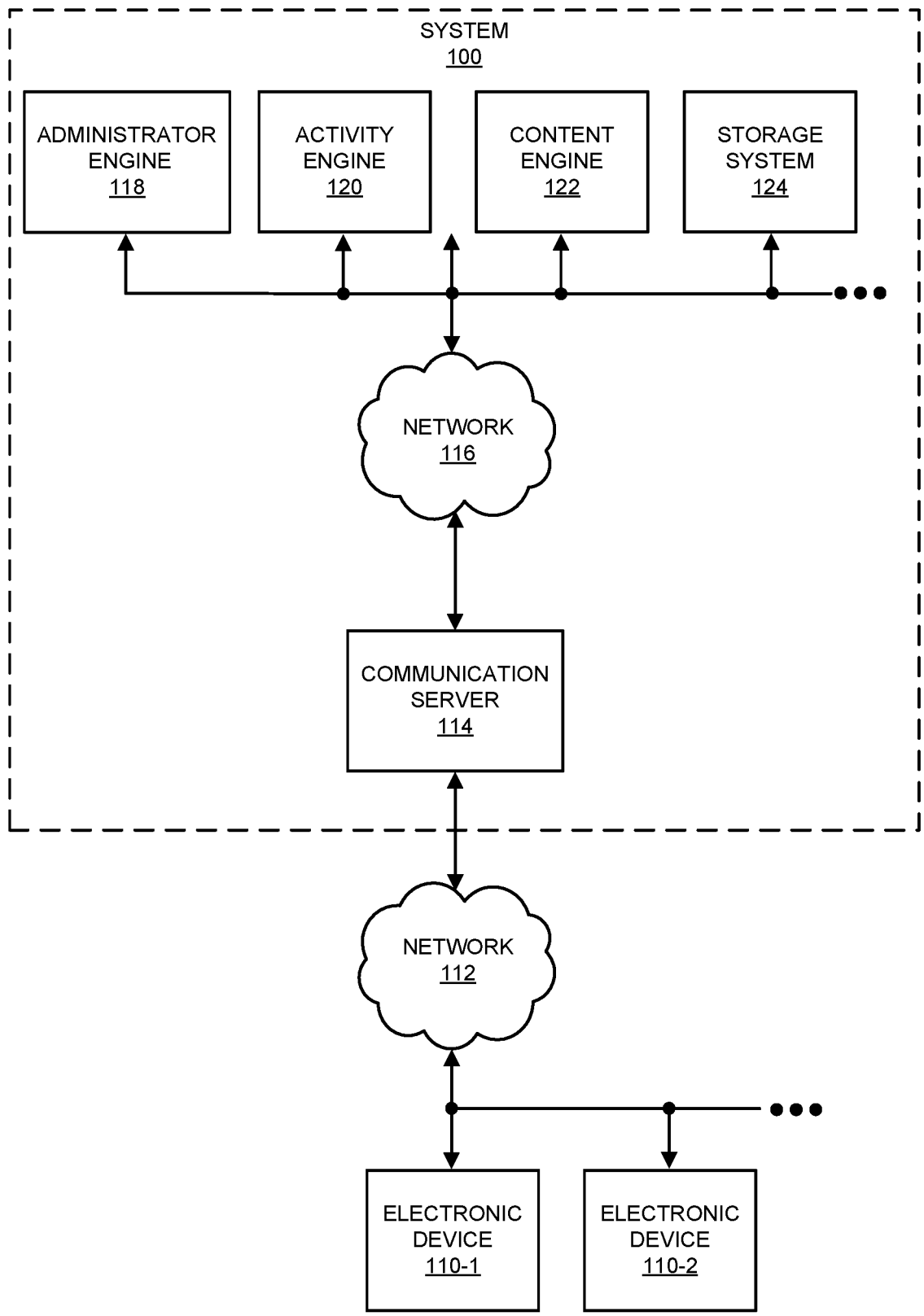
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for processing queries of a graph database. In these embodiments, a graph database stores a graph that includes a set of nodes and edges between pairs of the nodes. For example, nodes in the graph represent members, organizations, locations, jobs, content, and/or other entities in an online network. Edges between the nodes represent relationships and/or interactions between the corresponding entities, such as connections between pairs of members, education of members at schools, employment of members at companies, following of a member or company by another member, business relationships and/or partnerships between organizations, residence of members at locations, creating or sharing articles or posts, sending and receiving messages, sending or accepting connection requests, endorsements or recommendations between members, reviews by the members, applying to opportunities, joining groups, and/or following other entities.

More specifically, the disclosed embodiments provide a method, apparatus, and system for enforcing path consistency during processing of path queries in the graph database. A path query includes traversing one or more paths that include nodes in the graph and edges between the nodes. The path query also, or instead, includes an execution path that is used to generate intermediate and/or final query results of the path query.

During processing of a path query, a data structure is used to store the intermediate results of the query. The data structure includes rows in a set of tables, as well as one-to-one or one-to-many links between pairs of rows in different tables. One or more operations are performed on the data structure to update the intermediate results and/or generate a final result of the query. As the operations are applied, the data structure is used to track representations of data, relationships, and path consistency in the query.

For example, the data is stored in rows and/or columns of tables in the data structure. Relationships in the data (e.g., edges between nodes in the graph database, data that is calculated/derived from other data, etc.) are represented using multiple columns in the same table and/or one-to-one or one-to-many links between rows in different tables. Path consistency is tracked and/or enforced using a first invariant that requires a link to every destination row from a corresponding source row and/or a second invariant that requires multiple paths that arrive at the same destination row to begin at the same source row.

Path consistency is also, or instead, enforced by some or all operations performed using the data structure. The operations include a batch expand operation that expands multiple rows from a first table into multiple rows in a second table.

The operations also, or instead, include a zip operation that enforces path consistency by producing a cross product from source rows in a set of tables while ensuring that all paths from each row in the cross product reach a common row in all ancestors of the set of tables. To perform the zip operation, a relation is constructed to include rows representing source rows in one or more of the tables and a set of columns, with each column containing source rows in a common ancestor of the tables. Next, individual columns are incrementally added to the set of columns until all ancestors of the table(s) are included in the relation. After a given column is added to the set of columns in the relation, the cross products are evaluated (i.e., generated, updated, and/or filtered) using an attribute represented by the column.

The operations also, or instead, include an unzip operation that extracts one or more columns from one or more source tables into a destination table. Next, the unzip operation creates a first set of links from a first set of rows in the destination table to corresponding rows in the source table (s). The unzip operation also creates a second set of links from a second set of rows in one or more base tables to the first set of rows in the destination table based on paths between the second set of rows and the corresponding rows in the source table(s).

The operations also, or instead, include a reduce operation that aggregates multiple rows from a first table into one or more rows in a second table based on groupings of the rows in a third table. The operations also, or instead, include a stitch operation that creates a link between a first row in a destination table and a second row in a source table when the first and second rows share a common ancestor and one or more columns with matching values.

By using invariants and/or operations to enforce path consistency during evaluation of path queries in the graph database, the disclosed embodiments improve the correctness and/or flexibility of the path queries. In particular, the data structure can be used to identify relationships between source rows and destination rows and/or starting points of paths to destination rows, which inherently allows invariants representing path consistency to be enforced during path query evaluation. In contrast, conventional techniques may require callers of the operations to manually specify common ancestors of pairs of tables in the data structure, which limits the types of path queries that can be processed using the data structure.

Second, the data structure and/or operations applied to the data structure are implemented in ways that improve performance and/or reduce computational overhead over conventional techniques for processing queries. For example, a query that identifies a set of recipients of posts, updates, articles, or other content related to a member retrieves a list of members representing the member's first-degree connections and a separate list of members representing the member's followers. If the member has X first-degree connections and Y followers, a single table storing the result of the query requires up to X*Y rows representing all possible combinations of the member's connections and followers. Conversely, storing first-degree connections and followers in separate tables in the data structure requires only X+Y rows representing individual connections or followers of the member. Consequently, the disclosed embodiments provide technological improvements in applications, tools, computer systems, and/or environments for storing, querying, creating, and/or modifying data and/or databases.

Enforcing Path Consistency in Graph Database Path Query Evaluation

FIG. 1 shows a schematic of a system 100 in accordance with the disclosed embodiments. In this system, users of electronic devices 110 use a service that is provided, at least in part, using one or more software products or applications executing in system 100. As described further below, the applications are executed by engines in system 100.

Moreover, the service is provided, at least in part, using instances of a software application that is resident on and that executes on electronic devices 110. In some implementations, the users interact with a web page that is provided by communication server 114 via network 112, and which is rendered by web browsers on electronic devices 110. For example, at least a portion of the software application executing on electronic devices 110 includes an application tool that is embedded in the web page, and that executes in a virtual environment of the web browsers. Thus, the application tool is provided to the users via a client-server architecture.

The software application operated by the users includes a standalone application or a portion of another application that is resident on and that executes on electronic devices 110 (such as a software application that is provided by communication server 114 or that is installed on and that executes on electronic devices 110).

A wide variety of services can be provided using system 100. In the discussion that follows, a social network (and, more generally, a user community), such as an online professional network, which facilitates interactions among the users, is used as an illustrative example. Moreover, using one of electronic devices 110 (such as electronic device 110-1) as an illustrative example, a user of an electronic device uses the software application and one or more of the applications executed by engines in system 100 to interact with other users in the social network. For example, administrator engine 118 handles user accounts and user profiles, activity engine 120 tracks and aggregate user behaviors over time in the social network, content engine 122 receives user-provided content (audio, video, text, graphics, multimedia content, verbal, written, and/or recorded information) and provides documents (such as presentations, spreadsheets, word-processing documents, web pages, etc.) to users, and storage system 124 maintains data structures in a computer-readable memory that encompasses multiple devices, i.e., a large-scale storage system.

Note that each of the users of the social network have an associated user profile that includes personal and professional characteristics and experiences, which are sometimes collectively referred to as 'attributes' or 'characteristics.' For example, a user profile includes: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network.

Furthermore, the interactions among the users help define a social graph in which nodes correspond to the users and edges between the nodes correspond to the users' interactions, interrelationships, and/or connections. However, as described further below, the nodes in the graph stored in the graph database can correspond to additional or different information than the members of the social network (such as users, companies, etc.). For example, the nodes may correspond to attributes, properties or characteristics of the users.

It can be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner.

For example, when an application requests data associated with a complicated relationship (which may involve two or more edges, and which is sometimes referred to as a 'compound relationship'), a set of queries are performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results can, therefore, be time-consuming. This degraded performance can degrade the user experience when using the applications and/or the social network.

In order to address these problems, storage system 124 includes a graph database that stores a graph (e.g., as part of an information-storage-and-retrieval system or engine). Note that the graph allows an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
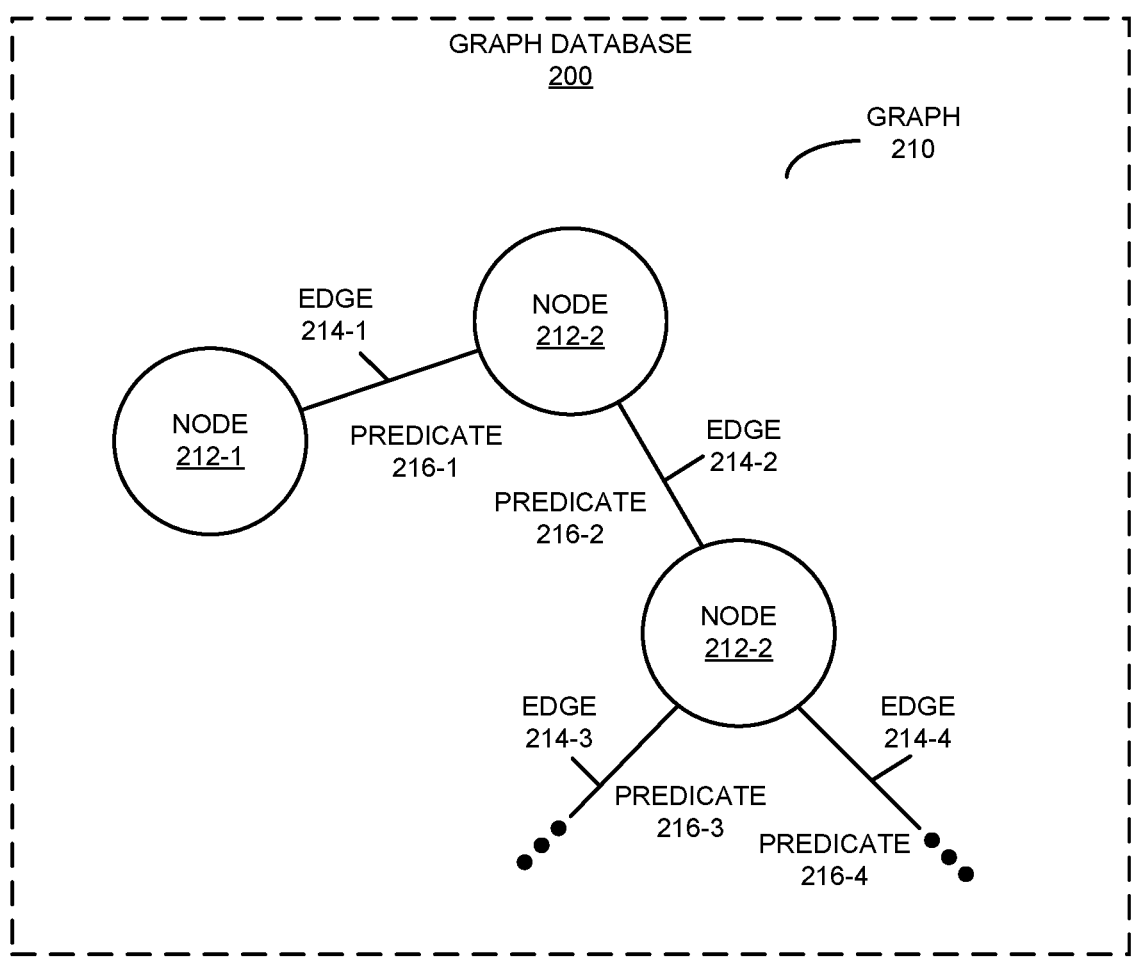
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212 and edges 214 between nodes 212 to represent and store the data with index-free adjacency, i.e., so that each node 212 in graph 210 includes a direct edge to its adjacent nodes without using an index lookup.

In one or more embodiments, graph database 200 includes an implementation of a relational model with constant-time navigation, i.e., independent of the size N, as opposed to varying as log(N). Moreover, all the relationships in graph database 200 are first class (i.e., equal). In contrast, in a relational database, rows in a table may be first class, but a relationship that involves joining tables may be second class. Furthermore, a schema change in graph database 200 (such as the equivalent to adding or deleting a column in a relational database) is performed with constant time (in a relational database, changing the schema can be problematic because it is often embedded in associated applications). Additionally, for graph database 200, the result of a query includes a subset of graph 210 that preserves the structure (i.e., nodes, edges) of the subset of graph 210.

The graph-storage technique includes embodiments of methods that allow the data associated with the applications and/or the social network to be efficiently stored and retrieved from graph database 200. Such methods are described in U.S. Pat. No. 9,535,963 (issued 3 Jan. 2017), entitled "Graph-Based Queries," which is incorporated herein by reference.

Referring back to FIG. 1, the graph-storage techniques described herein allow system 100 to efficiently and quickly (e.g., optimally) store and retrieve data associated with the applications and the social network without requiring the applications to have knowledge of a relational model implemented in graph database 200. Consequently, the graph-storage techniques improve the availability and the performance or functioning of the applications, the social network and system 100, which reduce user frustration and improve the user experience. Therefore, the graph-storage techniques further increase engagement with or use of the social network and, in turn, the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

In one or more embodiments, graph database 200 includes functionality to declaratively evaluate path queries using a data structure, a set of operations, and a set of constraints. In these embodiments, a path query represents a query that describes a path between two nodes 212 in graph 210. During declarative evaluation, two queries that return the same result are executed by graph database 200 in the same or substantially identical ways.

Figure 3:
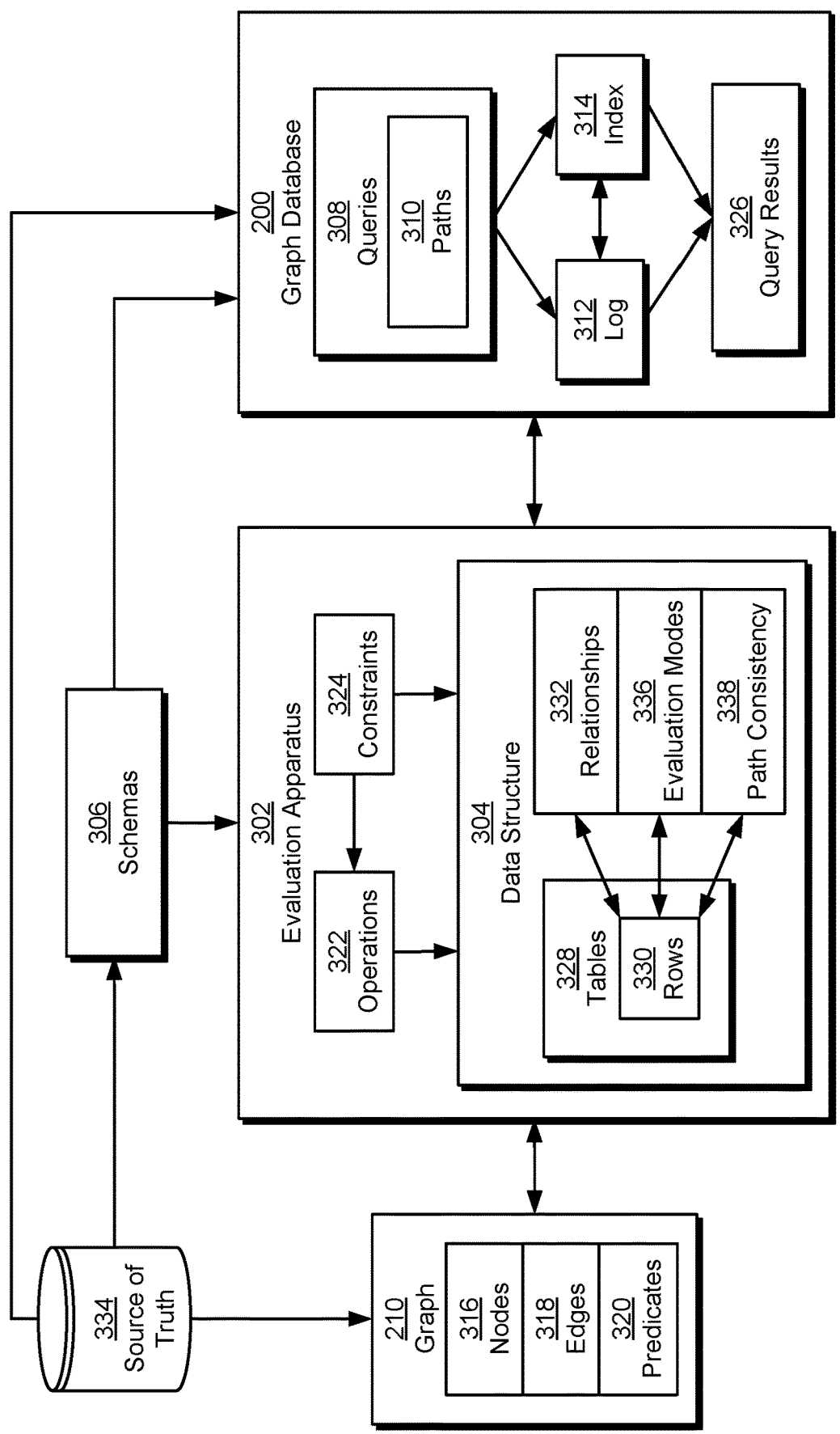
FIG. 3 shows a system for processing queries of a graph database in accordance with the disclosed embodiments.

As shown in FIG. 3, graph 210 and one or more schemas 306 associated with graph 210 are obtained from a source of truth 334 for graph database 200. For example, graph 210 and schemas 306 can be retrieved from a relational database, distributed filesystem, and/or other storage mechanism providing the source of truth.

As mentioned above, graph 210 includes a set of nodes 316, a set of edges 318 between pairs of nodes, and a set of predicates 320 describing the nodes and/or edges. Each edge in graph 210 is specified in a (subject, predicate, object) triple. For example, an edge denoting a connection between two members named "Alice" and "Bob" may be specified using the following statement:

Edge("Alice", "ConnectedTo", "Bob").

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")? Moreover, a subsequent statement modifies the initial statement with a tilde to indicate deletion of the edge from graph database 200:

Edge~("Alice", "ConnectedTo", "Bob").

In some embodiments, specific types of edges and/or complex relationships in graph 210 are defined using schemas 306. Continuing with the previous example, a schema for employment of a member at a position within a company is defined using the following:

DefPred("employ/company", "1", "node", "0", "node").
DefPred("employ/member", "1", "node", "0", "node").
DefPred("employ/start", "1", "node", "0", "date").
DefPred("employ/end_date", "1", "node", "0", "date").
M2C@(e, memberId, companyId, start, end):—
   Edge(e, "employ/member", memberId),
   Edge(e, "employ/company", companyId),
   Edge(e, "employ/start", start),
   Edge(e, "employ/end_date", end)

In the above schema, a compound structure for the employment is denoted by the "@" symbol and has a compound type of "M2C." The compound is also represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). Each predicate is defined using a corresponding "DefPred" call; the first argument to the call represents the name of the predicate, the second argument of the call represents the cardinality of the object associated with the edge, the third argument of the call represents the type of subject associated with the edge, the fourth argument represents the cardinality of the object associated with the edge, and the fifth argument represents the type of object associated with the edge.

In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

In another example, a compound relationship representing endorsement of a skill in an online professional network includes the following schema:

DefPred("endorser", "1", "node", "0", "node").
DefPred("endorsee", "1", "node", "0", "node").
DefPred("skill", "1", "node", "0", "node").
Endorsement@(h, Endorser, Endorsee, Skill):—
   Edge(h, "endorser", Endorser),
   Edge(h, "endorsee", Endorsee),
   Edge(h, "skill", Skill).

In the above schema, the compound relationship is declared using the "@" symbol and specifies "Endorsement" as a compound type (i.e., data type) for the compound relationship. The compound relationship is represented by three predicates defined as "endorser," "endorsee," and "skill." The "endorser" predicate may represent a member making the endorsement, the "endorsee" predicate may represent a member receiving the endorsement, and the "skill" predicate may represent the skill for which the endorsement is given. The declaration is followed by a rule that maps the three predicates to three edges. The first edge uses the first predicate to identify the endorser as the value specified in an "Endorser" parameter, the second edge uses the second predicate identify the endorsee as the value specified in an "Endorsee" parameter, and the third edge uses the third predicate to specify the skill as the value specified in a "Skill" parameter. All three edges share a common subject denoted by "h," which functions as a hub node that links the edges to form the compound relationship. Consequently, the schema may declare a trinary relationship for an "Endorsement" compound type, with the relationship defined by identity-giving attributes with types of "endorser," "endorsee," and "skill" and values attached to the corresponding predicates.

In one or more embodiments, compounds stored in graph database 200 model complex relationships (e.g., employment of a member at a position within a company) using a set of basic types (i.e., binary edges 318) in graph database 200. More specifically, each compound represents an n-ary relationship in graph 210, with each "component" of the relationship identified using the predicate and object (or subject) of an edge. A set of "n" edges that model the relationship can then be linked to the compound using a common subject (or object) that is set to a hub node representing the compound. In turn, new compounds can dynamically be added to graph database 200 without changing the basic types used in graph database 200, by specifying relationships that relate the compound structures to the basic types in schemas 306.

Graph 210 and schemas 306 are used to populate graph database 200 for processing queries 308 against the graph. For example, a representation of nodes 316, edges 318, and predicates 320 are obtained from source of truth 334 and stored in a log 312 in the graph database. Lock-free access to graph database 200 is implemented by appending changes to graph 210 to the end of the log instead of requiring modification of existing records in the source of truth. In turn, graph database 200 provides an in-memory cache of log 312 and an index 314 for efficient and/or flexible querying of the graph.

In one or more embodiments, nodes 316, edges 318, and predicates 320 are stored as offsets in log 312. For example, the exemplary edge statement for creating a connection between two members named "Alice" and "Bob" is stored in a binary log 312 using the following format:

256 Alice
261 Bob

264 ConnectedTo
275 (256, 264, 261)

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in log 312 are used as representations of virtual time in graph 210. More specifically, each offset represents a different virtual time in graph 210, and changes in the log up to the offset can be used to establish a state of graph 210 at the virtual time. For example, the sequence of changes from the beginning of log 312 up to a given offset that is greater than 0 are applied, in the order in which the changes were written, to construct a representation of graph 210 at the virtual time represented by the offset.

Graph database 200 also includes an in-memory index 314 that enables efficient lookup of edges 318 by subject, predicate, object, and/or other keys or parameters 310. In some embodiments, the index structure includes a hash map and an edge store. Entries in the hash map are accessed using keys such as subjects, predicates, and/or objects that partially define edges in the graph. In turn, the entries include offsets into the edge store that are used to resolve and/or retrieve the corresponding edges. Edge store designs for graph database indexes are described in a co-pending non-provisional application by inventors Andrew Rodriguez, Andrew Carter, Scott Meyer and Srinath Shankar, entitled "Edge Store Designs for Graph Databases," having Ser. No. 15/360,605, and filing date 23 Nov. 2016, which is incorporated herein by reference.

As mentioned above, the system of FIG. 3 uses a data structure 304, a set of operations 322, and a set of constraints 324 to evaluate graph database 200 queries 308 that contain paths 310. In some embodiments, a path includes one or more hops between two nodes 316 in graph 210; in other words, the path is defined by a sequence of edges 318 and/or additional nodes 316 in graph 210 that connect the two nodes. In turn, the path can be used to calculate a result of a query and/or may be included in the result.

Paths 310 also, or instead, refer to execution paths that are used to generate intermediate and/or final query results 326 of queries 308. That is, paths 310 within data structure 304 are used to track inputs, outputs, and/or operations 322 that are used to produce query results 326.

In one or more embodiments, data structure 304 includes a set of rows 330 in a set of tables 328, with rows in different tables connected via directional links representing one-to-one and/or one-to-many relationships 332. An evaluation apparatus 302 in or associated with graph database 200 stores intermediate and/or final results of queries 308 in tables 328 of data structure 304. For example, each table in data structure 304 includes rows 330 containing data related to an individual step involved in processing a query of graph database 200.

As a result, data structure 304 provides a more compact representation of intermediate results of queries 308 than a conventional query-evaluation technique that stores and/or returns a result of a query in a single table. For example, a query that identifies a set of recipients of posts, updates, articles, or other content related to a member retrieves a list of members representing the member's first-degree connections and a separate list of members representing the member's followers. If the member has X first-degree connections and Y followers, a single table storing the result of the query requires up to X*Y rows representing all possible combinations of the member's connections and followers. Conversely, storing first-degree connections and followers in separate tables 328 in data structure 304 requires only X+Y rows representing individual connections or followers of the member.

During processing of a query, evaluation apparatus 302 applies a set of basic operations 322 to rows 330 of source tables in data structure 304 to generate output that is stored in destination tables of data structure 304 and/or used to update relationships 332 between the tables. Additional operations 322 are optionally applied to data in existing tables to generate output that is stored in additional tables of data structure 304 and/or used to establish additional relationships 332 between the tables. Thus, evaluation of the path query proceeds using a series of tables 328 and relationships 332 that link a row of a given table to one or more rows in another table that are generated using the row.

More specifically, a given operation is applied to one or more rows 330 of a source table to generate output that is stored in one or more rows 330 of a destination table. Additional operations 322 may continue to be applied to existing tables 328 to generate additional tables 328 in data structure 304 until a final result of the query is produced. One or more operations 322 can be used to add links that establish additional relationships 332 between tables 328, in lieu of or in addition to adding new tables 328 to data structure 304. In turn, directional relationships 332 connecting input and output rows 330 in tables 328 form one or more paths 310 within data structure 304 that are used to determine the final result of the query, with a given path deemed to be valid when all rows along the path are valid.

For example, an operation is applied to four rows 330 of a source table to generate a total of 12 rows in a destination table, with the first row of the source table producing three rows in the destination table, the second row of the source table producing five rows in the destination table, the third row of the source table producing zero rows in the destination tables, and the fourth row of the source table producing four rows in the destination table. Relationships 332 between rows 330 of the source and destination tables are tracked using an array that stores offsets representing the ranges of rows in the destination table produced from rows in the source table, or [0, 3, 8, 8, 12]. Within the array, a given range of destination rows for the kth source row can be obtained from indexes k and k+1 in the array. Conversely, a given destination row can be matched to a source row using a binary search technique.

Evaluation apparatus 302 additionally uses relationships 332 between rows 330 in data structure 304 and evaluation modes 336 associated with tables 328 in data structure 304 to track and/or enforce path consistency 338 during execution of operations 322. In some embodiments, enforcing path consistency 338 includes verifying that individual points (e.g., rows 330 of tables 328) and/or sub-paths along each path in data structure 304 satisfy one or more constraints 324. Using constraints to evaluate path queries of graph databases is described in a co-pending non-provisional application, entitled "Path Query Evaluation in Graph Databases," having Ser. No. 15/939,065 and filing date 23 Mar. 2018, which is incorporated herein by reference.

To enforce path consistency 338 using evaluation modes 336, evaluation apparatus 302 sets and/or changes the evaluation mode of each table to be conjunctive, disjunctive, or optional. Evaluation apparatus 302 then removes one or more rows 330 in tables 328 based on the corresponding evaluation modes 336 and/or relationships 332 connecting rows 330 across tables 328. For example, evaluation apparatus 302 may use evaluation modes 336 and relationships 332 to propagate filtering of rows 330 in one table to rows 330 in other tables that are connected to the filtered rows via relationships 332.

In particular, a destination row in a table is removed if any source rows connected to the destination row via relationships 332 have been removed. If the table is in the optional evaluation mode, the removal of the destination row does not cause a source row connected to the destination row to be deleted. If the table is in the disjunctive evaluation mode, all destination rows must be removed for a given source row to be removed; conversely, all source rows must be removed for a destination row to be removed. If the table is in the conjunctive evaluation mode, a given source row is removed if all destinations associated with the source in another table have been removed; conversely, a destination row is removed if any source rows have been removed.

To enforce path consistency 338 using relationships 332, evaluation apparatus 302 maintains a number of invariants associated with rows 330 and/or relationships 332. A first invariant specifies that a valid path must exist from a root table (e.g., a table that is created at the beginning of a given query evaluation) in data structure 304 to rows 330 in all other tables 328 in data structure 304. A second invariant specifies that all paths from a given row in a destination table to a source table reach a common row in the source table. In other words, the first invariant requires a link to every destination row from a corresponding source row, and the second invariant requires multiple paths that arrive at the same destination row to begin at the same source row. If either invariant is not met by a given row in data structure 304, the row is removed.

In one or more embodiments, operations 322 used with data structure 304 to evaluate path queries 308 and/or enforce path consistency 338 during evaluation of the path queries 308 include an expand operation, a reduce operation, a zip operation, an unzip operation, and a stitch operation. The expand operation expands one row in table of data structure 304 into multiple rows in another table of data structure 304.

Figure 4A:
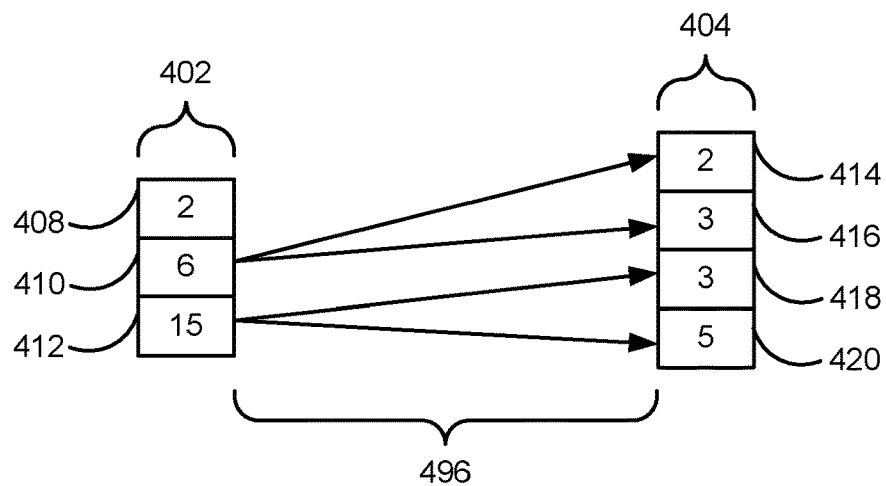
FIG. 4A shows an exemplary operation used in processing a path query of a graph database in accordance with the disclosed embodiments.

As shown in FIG. 4A, an exemplary expand operation is applied to three rows 408-412 of an input table 402 to produce four rows 414-420 of an output table 404. In particular, the exemplary expand operation calculates a set of proper factors from values of 2, 6, and 15 in rows 408-412. As a result, output rows 414-416 store proper factors of 2 and 3 for the input value of 6 in row 410, and output rows 418-420 store proper factors of 3 and 5 for the input value of 15 in row 412. Because the input value of 2 in row 408 does not have any proper factors, table 404 does not include any output rows for row 408.

The exemplary expand operation also tracks relationships 496 between data in rows 408-412 of input table 402 and data in rows 414-420 in output table 404. For example, relationships 496 include two directed edges from row 410 to rows 414 and 416, and two directed edges from row 412 to rows 418 and 420. Consequently, relationships 496 identify which rows 408-412 in table 402 are used by the expand operation to generate rows 414-420 in table 404.

In turn, the expand operation allows evaluation apparatus 302 to process various types of data related to graph 210 and/or graph database 200. For example, evaluation apparatus 302 applies the expand operation to an input row of a source table containing a member identifier to identify a set of first-degree connections for the member represented by the member identifier. Evaluation apparatus 302 then stores the first-degree connections in a set of output rows 330 of a destination table in data structure 304 and connects the input and output rows with one or more relationships 332. In other words, evaluation apparatus 302 uses the expand operation to retrieve the member's first-degree connections from graph database 200.

In another example, evaluation apparatus 302 uses the expand operation to identify, in an source table with two columns, rows with (subject, predicate) or (object, predicate) pairs in a (subject, predicate, object) triple that defines edges 318 in graph 210. First, evaluation apparatus 302 performs a trivial expand that creates an intermediate table and sets the evaluation mode of the intermediate table to optional. Next, evaluation apparatus 302 performs two additional expand operations from the intermediate table: one expand identifies (subject, predicate) pairs in the source table, and the other expand identifies (object, predicate) pairs in the source table. Evaluation apparatus 302 then changes the evaluation mode of the intermediate table to disjunctive, which causes rows that do not contain (subject, predicate) values or (object, predicate) values to be removed from data structure 304.

In one or more embodiments, evaluation apparatus 302 performs the expand operation as a "batch expand" operation that generates a set of results from all rows in an input table of data structure 304 before populating an output table with the results. For example, the batch expand can be used to calculate proper factors of values in all three rows 408-412 of table 402 before storing the proper factors in rows 414-420 of table 404 and establishing relationships 496 between the source and destination rows. In turn, the batch expand operation expedites database accesses required to retrieve data involved in the operation.

The reduce operation aggregates multiple rows from one or more tables 328 of data structure 304 into a single row in another table of data structure 304. For example, the reduce operation is used to generate a sum, count, average, ratio, median, minimum, maximum, percentile, and/or other statistic or metric from a set of rows in one table, which are in turn generated from one row in another table. In turn, the aggregated values can be used to process queries 308 such as counting the number of edges with a given subject and predicate.

Figure 4B:
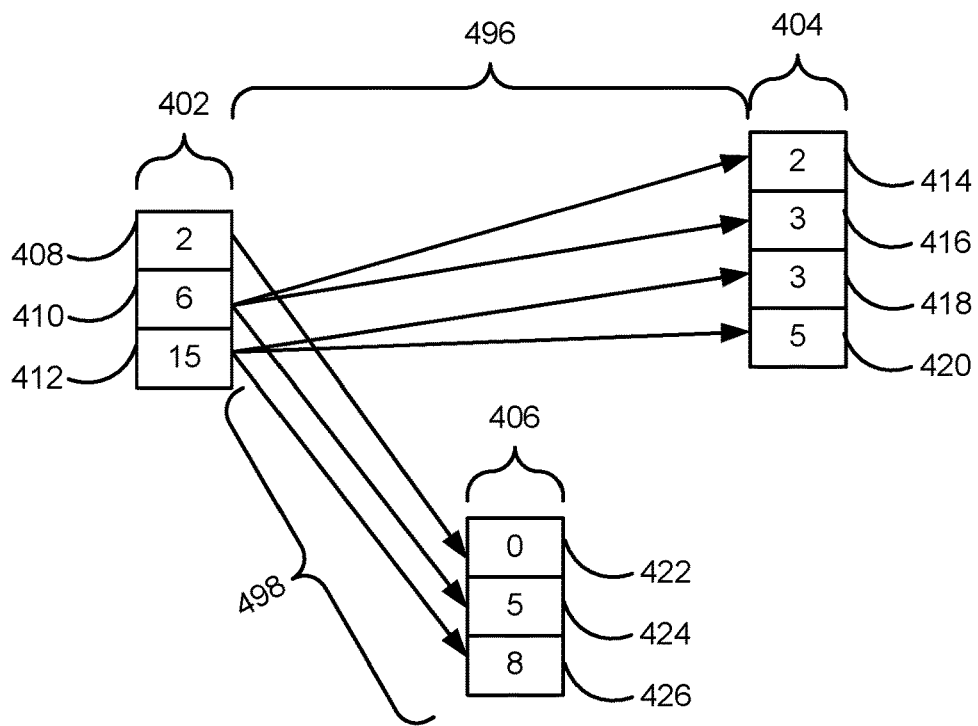
FIG. 4B shows an exemplary operation used in processing a path query of a graph database in accordance with the disclosed embodiments.

As shown in FIG. 4B, an exemplary reduce operation is used with the exemplary expand operation of FIG. 4A to produce a third table 406 from the contents of table 402 and/or table 404. More specifically, the exemplary reduce operation sums the proper factors generated from three rows 408-412 of table 402 and store the sums in three corresponding rows 422-426 of table 406. In the reduce operation, relationships 496 between table 402 and table 404 are used to identify groupings of rows 414-420 in table 404 from which the sums are generated. In particular, row 408 in table 402 is linked to zero rows in table 404, row 410 in table 402 is linked to rows 414-416 in table 404, and row 412 in table 402 is linked to rows 418-420 in table 404.

As a result, the input value of 2 in row 408 has an output value of 0 in row 422 (because 2 has zero proper factors), the input value of 6 in row 410 has an output value of 5 in row 424 (by summing the values of 2 and 3 in rows 414 and 416), and the input value of 15 in row 412 has an output value of 8 in row 426 (by summing the values of 3 and 5 in rows 418 and 420). A set of relationships 498 between tables 402 and 406 is used to track the generation of row 422 from row 408, the generation of row 424 from row 410, and the generation of row 426 from row 412.

In some embodiments, the reduce operation also supports aggregation functions that return more than one row. For example, the reduce operation can be used to return the top n rows from a source table.

The zip operation produces a cross product from source rows in multiple tables while ensuring that all paths from each row in the cross product reach a common row in all ancestors of the multiple tables. As a result, the zip operation can be used to establish or maintain path consistency 338 in rows 330 and/or tables 328 of data structure 304.

Figure 4C:
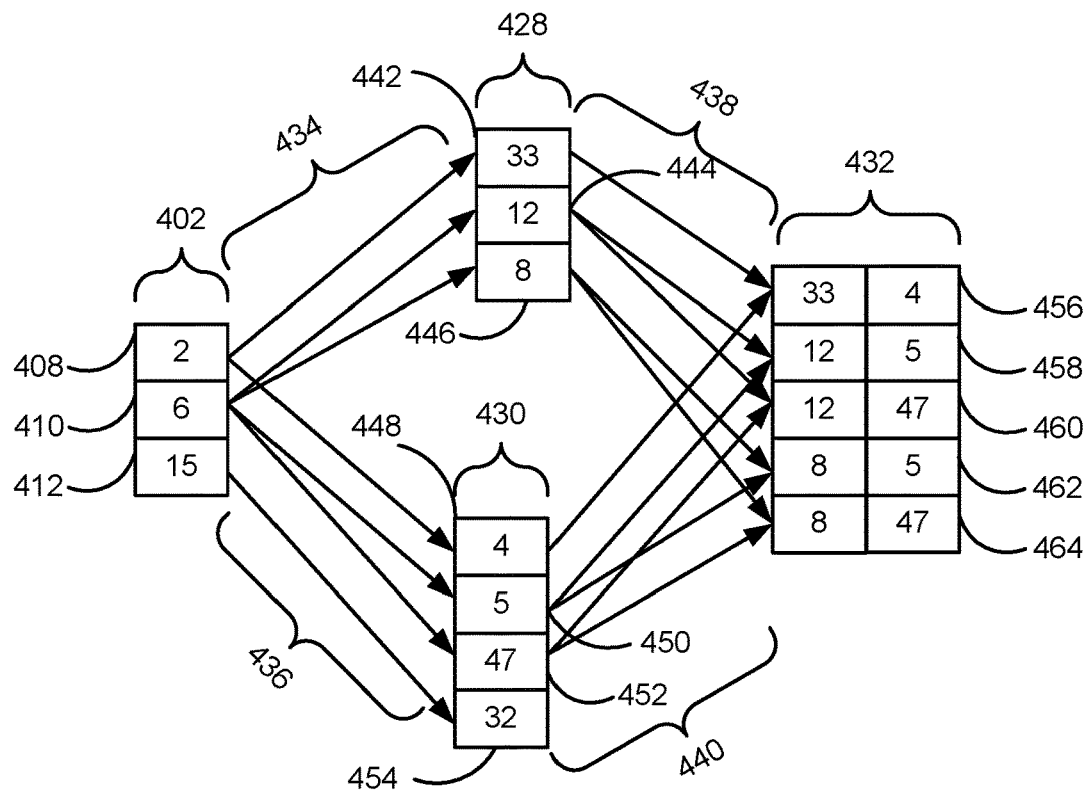
FIG. 4C shows an exemplary operation used in processing a path query of a graph database in accordance with the disclosed embodiments.

As shown in FIG. 4C, an exemplary zip operation is applied to rows 442-454 of two source tables 428-430 to produce an output table 432. Rows 456-464 in output table 432 contain cross products of rows 442-446 in table 428 and rows 448-454 in table 430. The cross products are further generated based on relationships 434 between rows 442-446 in table 428 and rows 408-412 of table 402, as well as an additional set of relationships 436 between rows 448-454 in table 430 and rows 408-412 of table 402. In this context, table 402 represents a common ancestor of table 428 and table 430 (i.e., a starting point of paths to table 428 and table 430).

In particular, relationships 434 indicate that within table 428, row 442 is generated from row 408 and rows 444-446 are generated from row 410. Relationships 436 indicate that, within table 430, row 448 is generated from row 408, rows 450-452 are generated from row 410, and row 454 is generated from row 412. These relationships 434-436 are automatically identified by evaluation apparatus 302 (e.g., using data structure 332) while performing the zip operation instead of requiring the caller of the zip operation to manually specify tables or attributes involved in generating cross products using the zip operation. In other words, the zip operation inherently enforces path consistency 338 during creation of rows 456-464 in table 432 from corresponding rows 442-454 in the source tables 428-430.

As a result, table 432 stores cross products of rows 442-454 in tables 428 and 430 that come from the same row in table 402. Row 456 in table 432 contains the cross product of row 442 and row 448 since both rows 442 and 448 are linked to row 408 in table 402. Similarly, rows 458-464 in table 432 contain the cross product of rows 444-446 and rows 450-452, since all four rows 444-446 and 450-452 are linked to the same row 410 in table 402. Finally, no rows in table 432 have paths that originate in row 412 since row 412 does not produce any rows in table 428. Generation of the cross products between tables 328 and 430 is further tracked in one set of relationships 438 between tables 428 and 432 and in another set of relationships 440 between tables 430 and 432.

Because the zip operation maintains path consistency 338 in data structure 304, the zip operation allows evaluation apparatus 302 to evaluate certain types of graph database 200 queries 308. One type of query includes a triangle query that retrieves all triples (a, b, c) where an edge with a specific predicate exists from a to b, b to c, and c to a. To process the query, evaluation apparatus 302 creates three source tables: one stores (a, b) pairs, another stores (b, c) pairs, and the third stores (c, a) pairs. Evaluation apparatus 302 then applies the zip operation to all three source tables to ensure that cross products in the resulting output table contain (a, b, c) triples that form triangles instead of hexagons.

In one or more embodiments, evaluation apparatus 302 streamlines the zip operation by generating cross products using a worst-case optimal join of the source tables. First, evaluation apparatus 302 constructs a new relation for one or more source tables in the zip operation. Rows in the relation represent rows in the source table(s), and columns in the relation represent source rows of the rows in common ancestors of the source tables. As a result, each column in the relation represents an attribute that affects cross products produced by the zip operation. Evaluation apparatus 302 then performs the zip operation by incrementally adding columns to the relation and evaluating the cross products using the attribute represented by each new column until all ancestors of the source table are included in the relation.

Unlike the zip operation, the unzip operation is used to extract a subset of columns from existing tables 330. Input to the unzip operation includes one or more source tables and one or more "base" tables in data structure 304. The unzip operation extracts one or more columns from the source table(s) into a destination table, creates a first set of links from rows of the destination table to corresponding rows in the source table(s), and creates a second set of links from additional rows of the base table(s) to the rows in the destination table based on paths between rows in the base table to the rows in the destination table. As a result, the unzip operation creates both incoming links to the newly created destination table (i.e., from the base table(s)) and outgoing links from the destination table (i.e., to the source table(s)).

Figure 4D:
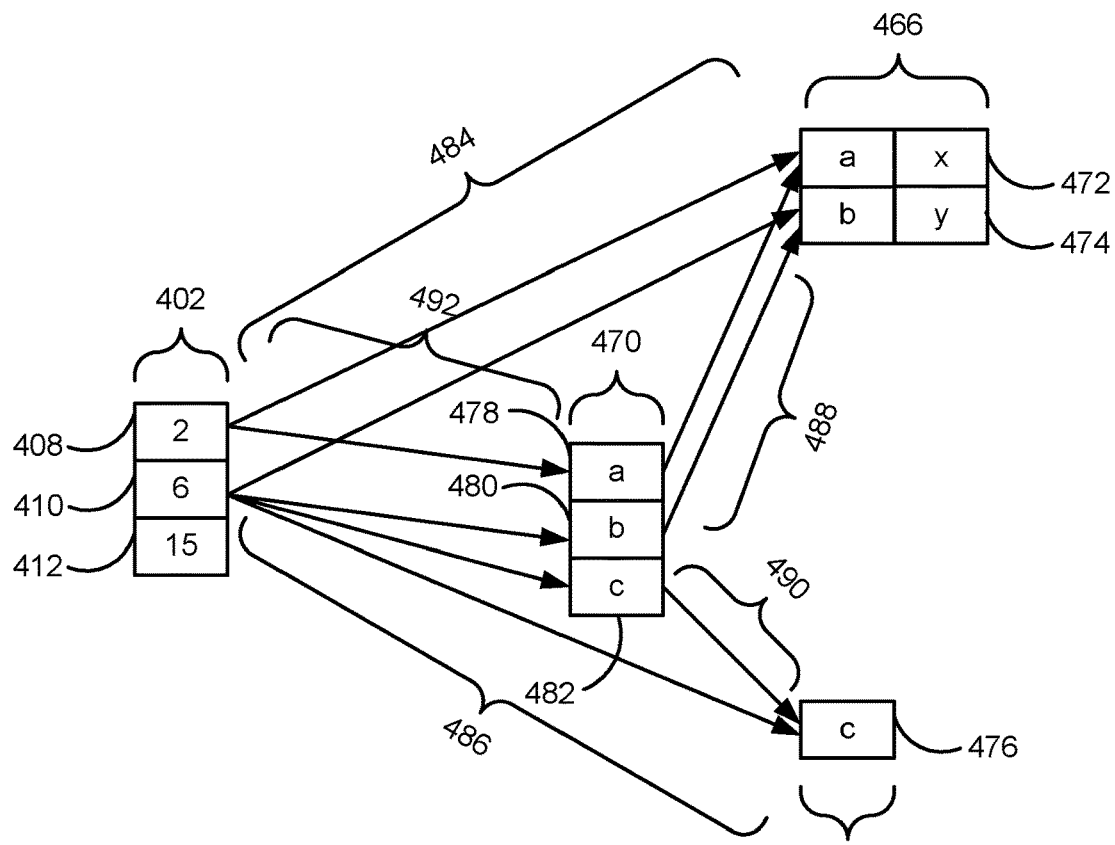
FIG. 4D shows an exemplary operation used in processing a path query of a graph database in accordance with the disclosed embodiments.

As shown in FIG. 4D, table 402 acts as a base table for an exemplary unzip operation, and two other tables 466-468 act as source tables for the unzip operation. The unzip operation creates an output table 470 with two rows 478-480 extracted from two rows 472-474 of table 466 and one row 482 extracted from one row 476 of table 468. Rows 478-480 store values from the first column of table 466, which is also specified as input to the unzip operation, and row 482 stores a value from the only column of table 468, which is optionally specified as input to the unzip operation.

The unzip operation also creates relationships 488-490 between rows 478-482 of table 470 and corresponding rows 472-476 of tables 466-468 used to populate rows 478-482. More specifically, relationships 488 include outgoing links from rows 478 and 480 of table 470 to rows 472 and 474 of table 466, respectively. Similarly, relationship 490 includes an outgoing link from row 482 of table 470 to row 476 of table 468.

The unzip operation additionally creates relationships 492 between rows 478-482 of table 470 and rows 408-410 of the base table 402 with paths to rows 472-476 of source tables 466-468 used to populate table 470. Relationships 492 include an outgoing link from row 408 of table 402 to row 478 of table 470 and two outgoing links from row 410 of table 402 to rows 480-482 of table 470. The link from row 408 to row 478 indicates that row 478 is created from row 472, which includes a path to the source row 408 in the base table 402. Links from row 410 to rows 480-482 indicate that rows 480-482 are created from rows 474-476 with paths to the same source row 410 in the base table 410.

The unzip operation is further performed based on the evaluation mode of the destination table (e.g., table 470 of FIG. 4D). If the destination table is disjunctive, each row in the destination table maps to a corresponding row in a source table and a row in a base table that is connected to the row in the source table by a path. If the destination table is conjunctive, rows in the destination table are deduplicated.

The unzip operation can be used to process queries 308 that involve the intersection of two or more sets of values. For example, evaluation apparatus 302 processes a query for identifying a set of users that have worked at two companies. First, evaluation apparatus 302 performs a series of expand and/or other operations 322 to create tables 328 storing nodes 316, edges 318, and/or predicates 320 related to employees at each individual company. These operations 322 result in one table storing the employees of one company and another table storing the employees of another company. Evaluation apparatus 302 then performs a conjunctive unzip using the two tables as source tables and a common ancestor of the two tables as a base table to create a destination table storing a deduplicated set of employees that have worked at both companies.

The stitch operation creates a link between a first row in a destination table and a second row in a source table when the first and second rows share a common ancestor and one or more columns with matching values. As a result, the stitch operation can be used to explicitly identify a previously implicit relationship between the column(s) in the source and destination tables and, in turn, enforce path consistency 338 between the source and destination tables.

For example, evaluation apparatus 302 uses the stitch operation to evaluate the triangle query, which retrieves all triples (a, b, c), where an edge with a specific predicate exists from a to b, b to c, and c to a. First, evaluation apparatus 302 stores one or more values of a in a first table and applies an expand operation to the first table to generate a second table containing values of b that have edges 318 with the corresponding values of a in the first table. Next, evaluation apparatus 302 applies an expand operation to the second table to generate a third table containing values of c that have edges 318 with the corresponding values of b in the second table. As a result, relationships between rows in the first and second tables represent the first edge in a triangle (i.e., from a to b), and relationships between rows in the second and third tables represent the second edge in the triangle (i.e., from b to c).

Continuing with the above example, evaluation apparatus 302 then applies an expand operation to the first table to generate a fourth table containing values of c that have edges 318 with the corresponding values of a in the first table. Finally, evaluation apparatus 302 applies the stitch operation to the third and fourth tables to explicitly indicate that the third and fourth tables both contain values of c in the triangle query. In turn, the stitch operation removes, from each of the third and fourth tables, rows that are not shared by both tables. After the stitch operation is complete, triangles can be identified from triples (a, b, c) that include edges between the first and second, second and third, third and fourth, and first and fourth tables.

Those skilled in the art will appreciate that the system of FIG. 3 may be implemented in a variety of ways. First, evaluation apparatus 302, graph database 200, and/or source of truth 334 may be provided by a single physical machine, multiple computer systems, one or more virtual machines, a grid, one or more databases, one or more filesystems, and/or a cloud computing system. Evaluation apparatus 302, graph database 200, and/or source of truth 334 may additionally be implemented together and/or separately by one or more hardware and/or software components and/or layers. For example, evaluation apparatus 302 may be implemented as a process or module that operates within and/or with graph database 200 and/or using one or more APIs for accessing graph database 200.

Second, the functionality of the system may be used with other types of databases and/or data. For example, evaluation apparatus 302 may be used to enforce path consistency during processing of queries of relational databases, distributed filesystems, data warehouses, streaming data, and/or other types of data.

Figure 5:
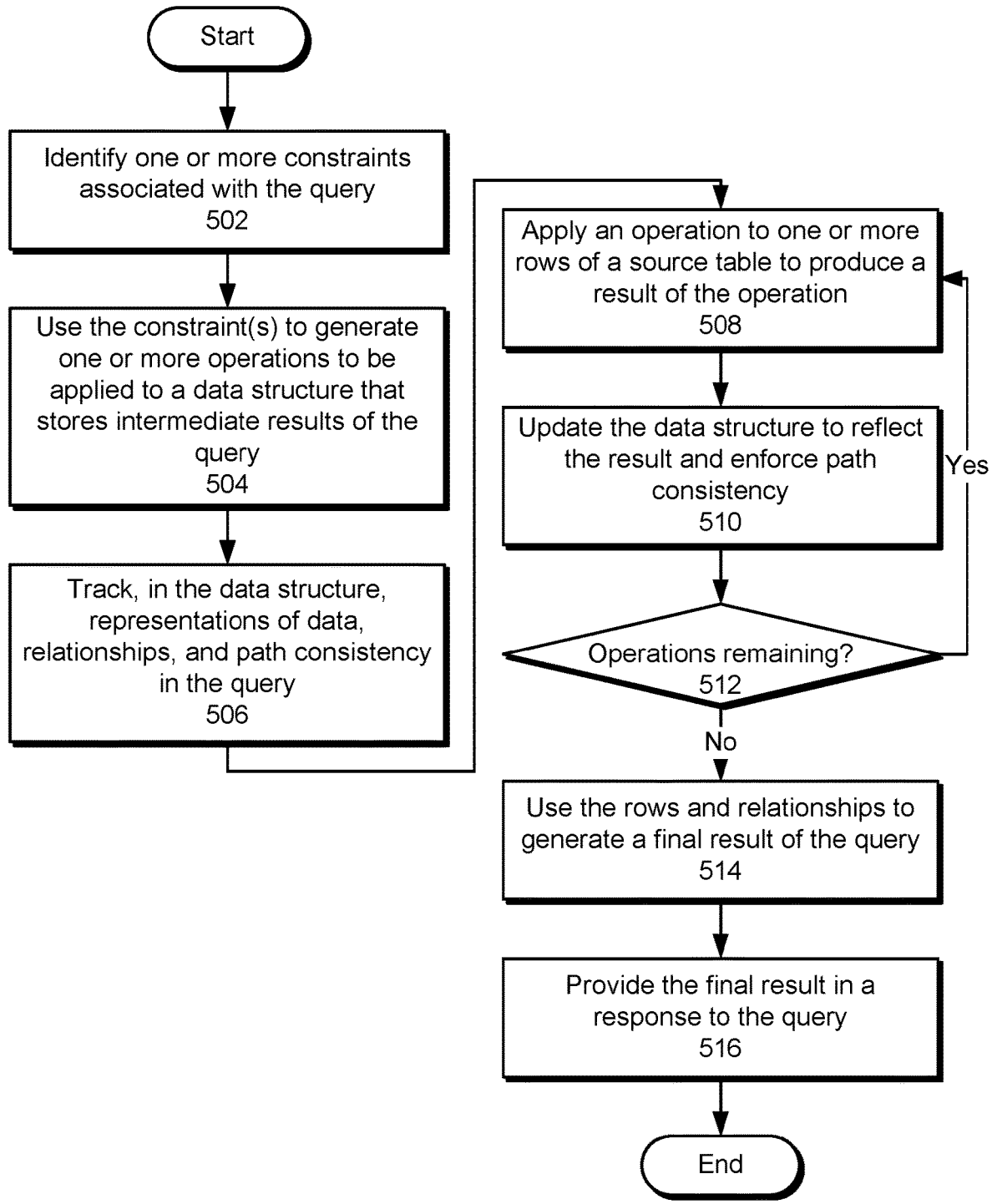
FIG. 5 shows a flowchart illustrating the processing of a query of a graph database in accordance with the disclosed embodiments.

FIG. 5 shows a flowchart illustrating the processing of a query of a graph database in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, one or more constraints associated with the query are identified (operation 502) and used to generate one or more operations to be applied to a data structure that stores intermediate results of the query (operation 504). The data structure includes rows in a set of tables and links between pairs of rows in different tables. The constraints include an edge constraint that requires an edge associated with three variables, a union constraint that links one value to two or more other values, an optional constraint to be applied to a portion of the query, and/or an aggregation constraint for performing an aggregation within the query.

Next, the data structure is used to track representations of data, relationships, and path consistency in the query (operation 506). For example, the data is stored in rows and/or columns of tables in the data structure. Relationships in the data (e.g., edges between nodes in the graph database, data that is calculated/derived from other data, etc.) are represented using columns in the same table and/or one-to-one or one-to-many links between rows in different tables. Path consistency is tracked and/or enforced using a first invariant that requires a link to every destination row from a corresponding source row and/or a second invariant that requires multiple paths that arrive at the same destination row to begin at the same source row.

An operation to one or more rows of a source table is applied to produce a result of the operation (operation 508), and the data structure is updated to reflect the result and enforce path consistency (operation 510). For example, the operation includes a batch expand operation that expands multiple rows from a first table into multiple rows in a second table.

In another example, the operation includes a zip operation that produces a cross product from source rows in a set of tables while enforcing path consistency by ensuring that all paths from each row in the cross product reach a common row in all ancestors of the tables. To perform the zip operation, a relation is constructed to include rows representing source rows in one or more of the tables and a set of columns, with each column containing source rows in an common ancestor of the tables. Next, individual columns are incrementally added to the set of columns until all ancestors of the source table are included in the relation. After a given column is added to the set of columns in the relation, the cross products are evaluated (i.e., generated, updated, and/or filtered) using an attribute represented by the column.

In a third example, the operation includes an unzip operation that extracts one or more columns from one or more source tables into a destination table. Next, the unzip operation creates a first set of links from a first set of rows in the destination table to corresponding rows in the source table(s). The unzip operation also creates a second set of links from a second set of rows in one or more base tables to the first set of rows in the destination table based on paths between the second set of rows and the corresponding rows in the source table(s).

In a fourth example, the operation includes a reduce operation that aggregates multiple rows from a first table into one or more rows in a second table based on groupings of the rows in a third table. In a fifth example, the operation includes a stitch operation that creates a link between a first row in a destination table and a second row in a source table when the first and second rows share a common ancestor and one or more columns with matching values.

To enforce path consistency in the updated data structure, the invariants described above are enforced after some or all types of operations. Alternatively or additionally, an evaluation mode of each table in the data structure is set to disjunctive, conjunctive, or optional, and removal of one or more of the rows across the set of tables is propagated based on the evaluation mode. For example, one or more operations may be used to filter rows from one or more tables. As a result, a destination row in a table is removed if any source rows connected to the destination row have been removed. If the table is in the optional evaluation mode, the removal of the destination row does not cause the source row to be deleted. If the table is in the disjunctive evaluation mode, all destination rows must be removed for a given source row to be removed; conversely, all source rows must be removed for a destination row to be removed. If the table is in the conjunctive evaluation mode, a given source row is removed if all destinations associated with the source in another table have been removed; conversely, a destination row is removed if any source rows have been removed.

Operations 508-510 may be repeated for remaining operations (operation 512) to be applied to the data structure. For example, operations may be applied to rows of existing tables to generate additional rows in new tables of the data structure and form/or new relationships across the tables until the data structure contains a path representing a final result of the query.

After all operations and row removals have been applied to the data structure, the final result is generated using the rows and relationships (operation 514) of the data structure and provided in a response to the query (operation 516). For example, the final result includes rows from one or more tables of the data structure.

Figure 6:
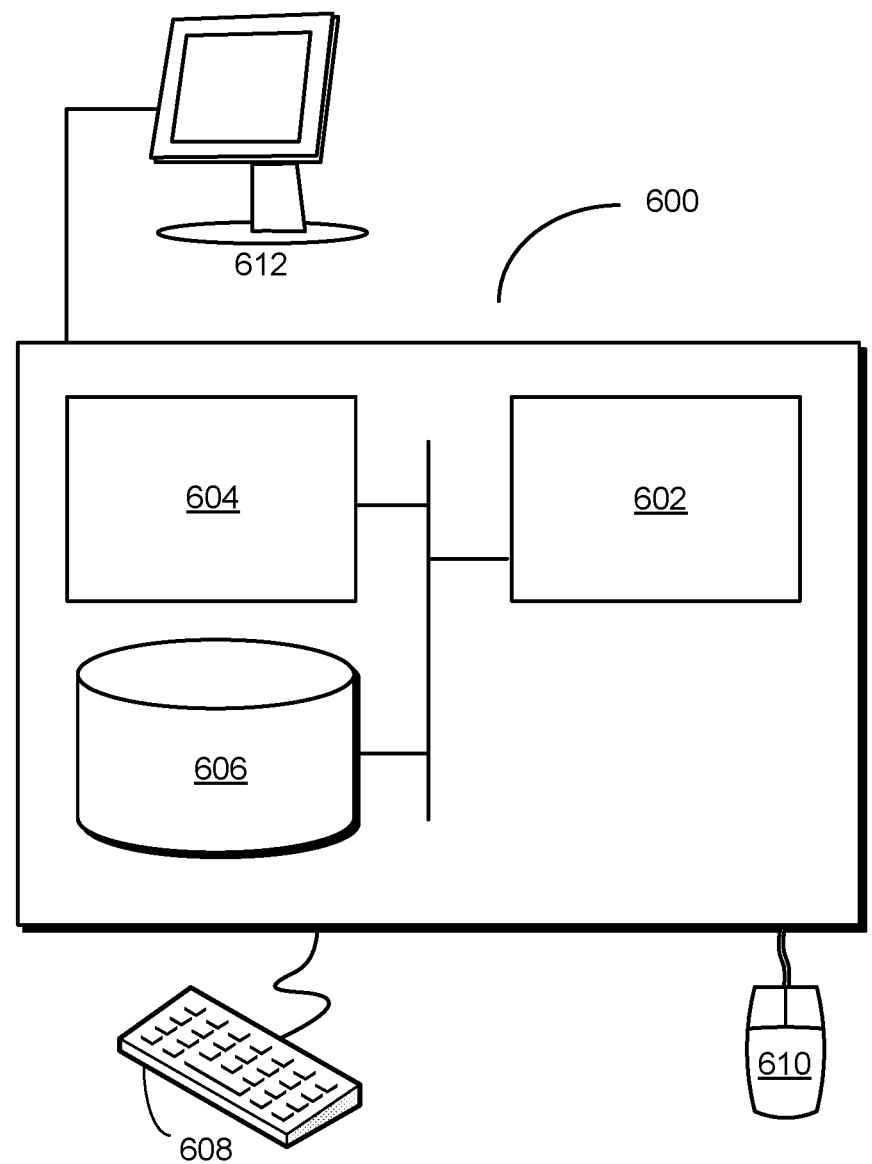
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing queries of a graph database. The system includes an evaluation apparatus that stores intermediate results of the query in a structure comprising rows in a set of tables and links between pairs of rows in different tables in the set of tables. Next, the evaluation apparatus tracks, in the structure, representations of data, relationships, and path consistency in the query. The evaluation apparatus then applies one or more operations to existing rows in the structure to generate a final result of the query. Finally, the evaluation apparatus provides the final result in a response to the query.

In addition, one or more components of computer system 600 may be remotely located and connected to the other components over a network. Portions of the present embodiments (e.g., evaluation apparatus, graph database, etc.) may also be located on different nodes of a distributed system that implements the embodiments. For example, the present embodiments may be implemented using a cloud computing system that performs path query evaluation in a remote graph database.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
executing one or more processes for storing a graph in a base version of a graph database, wherein the graph comprises a set of nodes, a set of edges between pairs of nodes in the set of nodes, and a set of predicates; and
when a query of the graph database is received, using one or more of the one or more processes to process the query by:
storing intermediate results of the query in a structure comprising rows in a set of tables and links between pairs of rows in different tables in the set of tables;

tracking, in the structure, representations of data, relationships, and path consistency in the query;

applying one or more operations to existing rows in the structure to generate a final result of the query; and providing the final result in a response to the query.

2. The method of claim 1, further comprising:

identifying one or more constraints associated with the query; and generating the one or more operations based on the one or more constraints.

3. The method of claim 1, wherein the one or more operations comprise a batch expand operation that expands multiple rows from a first table into multiple rows in a second table.

4. The method of claim 1, wherein the one or more operations comprise a zip operation that comprises producing a cross product from source rows in multiple tables while ensuring that all paths from each row in the cross product reach a common row in all ancestors of the multiple tables.

5. The method of claim 4, wherein applying the zip operation to the existing rows in the structure comprises:

for a table in the multiple tables, constructing a relation comprising a first set of rows representing a second set of rows in the table and a set of columns, wherein each column in the set of columns comprises source rows in a common ancestor of the multiple tables;

incrementally adding columns to the set of columns until all ancestors of the table are included in the relation; and after a column is added to the set of columns, evaluating the cross product using an attribute represented by the column.

6. The method of claim 1, wherein the one or more operations comprise an unzip operation that comprises:

extracting one or more columns from one or more source tables into a destination table;

creating a first set of links from a first set of rows in the destination table to corresponding rows in the one or more source tables; and creating a second set of links from a second set of rows in one or more base tables to the first set of rows in the destination table based on paths between the second set of rows and the corresponding rows in the one or more source tables.

7. The method of claim 1, wherein the one or more operations comprise a reduce operation that aggregates multiple rows from a first table into one or more rows in a second table based on groupings of the multiple rows in a third table.

8. The method of claim 1, wherein the one or more operations comprise a stitch operation that creates a link between a first row in a destination table and a second row in a source table when the first and second rows share a common ancestor and one or more columns with matching values.

9. The method of claim 1, wherein tracking the path consistency in the query comprises:

verifying a valid path from a root table in the structure to the rows in all other tables in the structure; and verifying that all paths from a first row in a destination table to a source table reach a common row in the source table.

10. The method of claim 1, wherein applying the one or more operations to the existing rows in the structure to generate the final result of the query comprises:

applying an operation to one or more rows of a source table in the structure to produce a result of the operation; and updating the structure to reflect the result and enforce the path consistency.

11. The method of claim 1, wherein applying the one or more operations to the existing rows in the structure to generate the final result of the query comprises:

for each table in the set of tables, setting an evaluation mode of the table to be disjunctive, conjunctive, or optional; and propagating removal of one or more of the rows across the set of tables based on the evaluation mode.

12. The method of claim 1, wherein the relationships comprise:

a one-to-one relationship between a first source row in a first table and a first destination row in a second table; and a one-to-many relationship between a second source row in the first table and multiple destination rows in the second table.

13. A system comprising:

one or more processors; and memory storing instructions that, when executed by the one or more processors, cause the system to:

execute one or more processes for storing a graph in a base version of a graph database, wherein the graph comprises a set of nodes, a set of edges between pairs of nodes in the set of nodes, and a set of predicates; and when a query of the graph database is received, using one or more of the one or more processes to process the query by:

storing intermediate results of the query in a structure comprising rows in a set of tables and links between pairs of rows in different tables in the set of tables;

tracking, in the structure, representations of data, relationships, and path consistency in the query;

applying one or more operations to existing rows in the structure to generate a final result of the query; and providing the final result in a response to the query.

14. The system of claim 13, wherein the one or more operations comprise a zip operation that comprises producing a cross product from source rows in multiple tables while ensuring that all paths from each row in the cross product reach a common row in all ancestors of the multiple tables.

15. The system of claim 14, wherein applying the zip operation to the existing rows in the structure comprises:

for a table in the multiple tables, constructing a relation comprising a first set of rows representing a second set of rows in the table and a set of columns, wherein each column in the set of columns comprises source rows in a common ancestor of the multiple tables;

incrementally adding columns to the set of columns until all ancestors of the table are included in the relation; and after a column is added to the set of columns, evaluating the cross product using an attribute represented by the column.

16. The system of claim 13, wherein the one or more operations comprise an unzip operation that comprises:

extracting one or more columns from one or more source tables into a destination table;

creating a first set of links from a first set of rows in the destination table to corresponding rows in the one or more source tables; and creating a second set of links from a second set of rows in one or more base tables to the first set of rows in the destination table based on paths between the second set of rows and the corresponding rows in the one or more source tables.

17. The system of claim 13, wherein the one or more operations comprise a reduce operation that aggregates multiple rows from a first table into one or more rows in a second table based on groupings of the multiple rows in a third table.

18. The system of claim 13, wherein the one or more operations comprise a stitch operation that creates a link between a first row in a destination table and a second row in a source table when the first and second rows share a common ancestor and one or more columns with matching values.

19. The system of claim 13, wherein tracking the path consistency in the query comprises:

verifying a valid path from a root table in the structure to the rows in all other tables in the structure; and verifying that all paths from a first row in a destination table to a source table reach a common row in the source table.

20. A non-transitory computer-readable storage medium storing instructions that when executed by a computer cause the computer to perform a method, the method comprising:

executing one or more processes for storing a graph in a base version of a graph database, wherein the graph comprises a set of nodes, a set of edges between pairs of nodes in the set of nodes, and a set of predicates; and when a query of the graph database is received, using one or more of the one or more processes to process the query by:

storing intermediate results of the query in a structure comprising rows in a set of tables and links between pairs of rows in different tables in the set of tables;

tracking, in the structure, representations of data, relationships, and path consistency in the query;

applying one or more operations to existing rows in the structure to generate a final result of the query; and providing the final result in a response to the query.

* * * * *